(12) United States Patent
Dang (10) Patent No.: US 8,919,002 B2
(45) Date of Patent: Dec. 30, 2014

(54) LASER SYSTEM FOR CREATING A LINEAR LASER MARKING

(71) Applicant: Hilti Aktiengesellschaft, Schaan (LI)

(72) Inventor: Lieu-Kim Dang, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 219 days.

(21) Appl. No.: 13/709,647

(22) Filed: Dec. 10, 2012

(65) Prior Publication Data
US 2013/0160310 A1 Jun. 27, 2013

(30) Foreign Application Priority Data
Dec. 22, 2011 (DE) .......................... 10 2011 089 557

(51) Int. Cl.
*G01C 15/00* (2006.01)
*G02B 5/10* (2006.01)

(52) U.S. Cl.
CPC .............. *G01C 15/00* (2013.01); *G01C 15/004* (2013.01); *G02B 5/10* (2013.01)
USPC .......................................................... 33/286

(58) Field of Classification Search
USPC ........................................................ 33/286
See application file for complete search history.

(56) References Cited

U.S. PATENT DOCUMENTS

| 3,820,903 | A | | 6/1974 | Kindl et al. |
| 4,679,937 | A | | 7/1987 | Cain et al. |
| 5,583,342 | A | * | 12/1996 | Ichie .......................... 250/459.1 |
| 5,764,828 | A | | 6/1998 | Iga et al. |
| 6,618,950 | B2 | * | 9/2003 | Huang et al. ..................... 33/286 |
| 6,892,463 | B1 | * | 5/2005 | Pu .................................... 33/281 |
| 7,170,675 | B2 | * | 1/2007 | Brooker ......................... 359/385 |
| 7,328,516 | B2 | * | 2/2008 | Nash et al. ....................... 33/286 |
| 7,497,018 | B2 | | 3/2009 | Hersey et al. |
| 8,307,562 | B2 | * | 11/2012 | Bascom et al. .................. 33/286 |
| 8,789,956 | B2 | * | 7/2014 | Dang et al. .................... 359/850 |
| 8,813,379 | B2 | * | 8/2014 | Zimmermann ................. 33/281 |
| 2011/0280017 | A1 | | 11/2011 | Dang et al. |
| 2012/0327662 | A1 | * | 12/2012 | Dang et al. .................... 362/259 |

FOREIGN PATENT DOCUMENTS

DE         10 2010 028794         11/2011

\* cited by examiner

*Primary Examiner* — Christopher Fulton
(74) *Attorney, Agent, or Firm* — Davidson, Davidson & Kappel, LLC (57) ABSTRACT

A laser system for creating a linear laser marking, including a radiation source that emits a laser beam and that emits it along a direction of propagation, a focusing lens assembly with an optical axis, and a conical mirror that, at least in certain areas, is configured as a straight cone with a cone axis and a reflecting lateral surface. The conical mirror is arranged in the beam path of the laser beam behind the focusing lens assembly, and the cone axis is oriented parallel to the optical axis of the focusing lens assembly. The direction of propagation of the laser beam is inclined at an angle relative to the optical axis of the focusing lens assembly.

13 Claims, 5 Drawing Sheets

LASER SYSTEM FOR CREATING A LINEAR LASER MARKING

This claims the benefit of German Patent Application DE 10 2011 089 557.4, filed Dec. 22, 2011 and hereby incorporated by reference herein.

The present invention relates to a laser system for creating a linear laser marking.

BACKGROUND

U.S. Pat. No. 7,497,018 B2 discloses a known laser system for creating a linear laser marking. The laser system comprises a radiation source, a collimating lens with an optical axis and a conical mirror with a cone axis as well as a deflecting mirror, which is arranged between the collimating lens and the conical mirror. A collimating lens is a special focusing lens assembly with infinite focal length. A conical mirror is a reflecting optical element that is shaped at least partially in the form of a cone with a base surface and a lateral surface adjacent to the base surface, whereby the lateral surface is configured as a reflecting surface from which a laser beam is deflected and expanded.

The radiation source is configured as a laser diode that emits a laser beam along a direction of propagation, whereby the direction of propagation of the laser beam runs parallel to the optical axis of the collimating lens. The laser beam strikes the collimating lens, which then creates a collimated laser beam out of the divergent laser beam. The collimated laser beam strikes the deflecting mirror, which deflects the collimated laser beam by 90° in the direction of the conical mirror. The conical mirror deflects the collimated laser beam and creates a laser beam that propagates in a plane perpendicular to the collimated laser beam, and then the conical mirror creates a linear laser marking on a projection surface, for example, a wall, a ceiling and/or a floor. A linear laser marking having a beamwidth of 180° is created when the collimated laser beam illuminates half of a cone. As long as the radius of the collimated laser beam is greater than the distance between the cone tip and the center of the collimated laser beam, a closed laser marking encompassing 360° is created, whereby the intensity of the linear laser marking and thus the visibility increase in the section of the cone where the center of the collimated laser beam is located. The cone axis of the conical mirror is arranged so as to be offset parallel to the optical axis of the collimating lens. Due to the parallel offset of the cone axis, the center of the collimated laser beam does not strike the cone tip but rather, the lateral surface of the conical mirror.

SUMMARY OF THE INVENTION

The prior-art laser system for creating a linear laser marking entails the drawback that an additional optical element in the form of a deflecting mirror is needed in order to generate the parallel offset of the laser beam relative to the cone axis. Each additional optical element has to be adjusted and increases the complexity of the laser system. Moreover, the prior-art laser system only allows the creation of linear laser markings at a beamwidth of 180°; laser markings with beamwidths that are smaller than 180° or greater than 180° cannot be created with the prior-art laser system.

It is an object of the present invention to provide a laser system for creating a linear laser marking in which the number of optical components is reduced and which allows the creation of a linear laser marking having a beamwidth that is smaller than 360°. In particular, it should be possible to adjust the beamwidth of the linear laser marking.

According to the invention, it is provided that the direction of propagation of the laser beam is inclined at an angle relative to the optical axis of the focusing lens assembly. Owing to the inclination of the laser beam and to the coaxial arrangement of the optical axis and the cone axis, the center of the collimated laser beam is on the lateral surface of the conical mirror and is offset with respect to the cone tip. This embodiment has the advantage that no additional optical element in the form of a deflecting mirror is needed in order to generate an offset between the cone axis and the collimated laser beam. The section of the reflecting lateral surface of the conical mirror that is illuminated by the collimated laser beam and thus the beamwidth of the linear laser marking can be adjusted via the angle of the laser beam relative to the optical axis of the focusing lens assembly.

The laser beam can be focused with a single focusing lens or with an optical system that is configured as a telescope and that consists of several optical elements. The term "focusing lens assembly" includes an individual focusing lens as well as optical focusing systems made up of several optical elements. The straight line running through the center of curvature of the light-refracting surfaces is defined as the optical axis of a focusing lens; if one of the two light-refracting surfaces is flat, the optical axis runs through the center of curvature of the curved light-refracting surface and is perpendicular to the flat surface. A focusing lens assembly can focus a laser beam either at a finite distance or to infinity. In the latter case, the incident light beam is collimated and the focusing lens assembly is also referred to as a collimating lens assembly.

Preferably, an angle-adjusting device is provided with which the angle between the direction of propagation of the laser beam and the optical axis of the focusing lens assembly can be adjusted around a center of rotation, whereby the center of rotation of the angle-adjusting device coincides with a virtual point source of the radiation source. The beamwidth of the linear laser marking on the projection surface can be changed by means of an angle-adjusting device. Moreover, the position of the linear laser beam within a plane perpendicular to the cone axis can be changed. Owing to the adjustability of the beamwidth of the linear laser beam, the entire laser output can be concentrated precisely where a visible linear laser marking is desired.

In this context, the center of rotation of the angle-adjusting device can be especially preferably arranged on the optical axis of the focusing lens assembly. If the center of rotation of the angle-adjusting device is located on the optical axis of the focusing lens assembly, it is ensured that the direction of propagation of the collimated laser beam runs parallel to the optical axis of the focusing lens assembly.

Preferably, the angle between the direction of propagation of the laser beam and the optical axis of the focusing lens assembly can be adjusted in a first direction and/or in a second direction. The adjustability of the angle in a given direction allows the user to create the linear laser marking on opposite projection surfaces, for instance, on opposite walls or on the floor and the ceiling. Since the angle can be adjusted in two directions, the linear laser marking can be created in any desired length and at any desired angular position. The angle-adjusting device comprises, for example, a spherical cap, in which the radiation source is mounted. The spherical cap entails the advantage that the inclination of the radiation source can be adjusted in two directions.

Preferably, an angle-adjusting device that can be driven by a motor is provided. The adjustability of the angle by means of a motor has the advantage that the beamwidth of the linear laser marking and the position on a projection surface are easy for the user to adjust.

In a preferred embodiment, a beam-splitting lens assembly is provided that splits the laser beam into a first partial beam along a first direction of propagation and into a second partial beam along a second direction of propagation. A laser system having a radiation source and a beam-splitting lens assembly that generates several partial beams is suitable especially for laser wavelengths that are highly visible to the human eye such as, for example, the green laser wavelengths of 532 nm and 555 nm, which are three to four times more visible than the often-employed red laser wavelength of 635 nm.

The beam-splitting lens assembly is especially preferably arranged in the beam path of the laser beam behind the focusing lens assembly. The arrangement of the beam-splitting lens assembly behind the focusing lens assembly has the advantage that the number of optical elements in the laser system is further reduced. Only one focusing lens assembly is needed in order to create two linear laser markings whose propagation planes are arranged at a defined angle, especially less than 90°. Here, the first linear laser marking is created out of the first partial beam by means of the conical mirror that is present in the laser system according to the invention. In order to create the second linear laser marking out of the second partial beam, another conical mirror or another optical element such as, for instance, a cylindrical lens, can be provided.

In a preferred embodiment, the focusing lens assembly and the conical mirror are integrated into a shared beam-shaping lens assembly. Configuring a shared beam-shaping lens assembly has the advantage that just one optical carrier is needed and the focusing lens assembly and the conical mirror are already adjusted with respect to each other when the beam-shaping lens assembly is manufactured. There is less adjustment work in comparison to a laser system in which the focusing lens assembly and the conical mirror are configured as separate optical elements.

In a preferred embodiment, a first radiation source and a second radiation source are provided, whereby the first radiation source emits a first laser beam along a first direction of propagation, and the second radiation source emits a second laser beam along a second direction of propagation. A laser system having two radiation sources entails the advantage that two laser beams with an elliptical beam distribution of the type found in typical semiconductor lasers have a homogenous beam distribution as a result of overlapping. Due to a homogenous distribution of the laser beam, the linear laser marking created on a projection surface exhibits uniform visibility.

Preferably, the first direction of propagation of the first laser beam is inclined at a first angle, and the second direction of propagation of the second laser beam is inclined at a second angle relative to the optical axis of the focusing lens assembly. In this context, special preference is given to providing a first angle-adjusting device for adjusting the first angle, and a second angle-adjusting device for adjusting the second angle.

In a first variant, the first and second radiation sources have different laser wavelengths. Radiation sources with different laser wavelengths entail the advantage that the linear laser markings created out of the laser beams of the radiation sources can be distinguished on a projection surface on the basis of the color of the laser beams. Suitable radiation sources include, for example, semiconductor lasers with a red laser wavelength of 635 nm and green laser wavelengths of 532 nm and 555 nm.

In a second variant, the first and second radiation sources have the same laser wavelength. In the case of radiation sources with the same laser wavelength, the beam distribution can be changed by overlapping and can be, for instance, homogenized. The visibility of the linear laser marking is improved.

BRIEF DESCRIPTION OF THE DRAWINGS

Embodiments of the invention will be described below with reference to the drawing. The drawing does not necessarily depict the embodiments true-to-scale, but rather, the drawing—where necessary for the sake of elucidation—is shown in schematic and/or slightly distorted form. Regarding any expansion of the teaching that can be gleaned directly from the drawing, reference is hereby made to the pertinent state of the art. Here, it has to be taken into account that many modifications and changes relating to the shape and to the detail of an embodiment can be made without deviating from the general idea of the invention. The features of the invention disclosed in the description, in the drawing as well as in the claims can be essential for the refinement of the invention individually as well as in any desired combination. Moreover, all combinations of at least two of the features disclosed in the description, in the drawing and/or in the claims fall within the scope of the invention. The general idea of the invention is not limited to the exact form or detail of the preferred embodiment shown and described below nor is it limited to a subject matter that would be limited in comparison to the subject matter put forward in the claims. At given rated ranges, values that fall within the specified limits are also to be disclosed as limit values and to be used and claimed as desired. For the sake of clarity, identical or similar parts or else parts with an identical or similar function are designated by the same reference numerals below.

The following is shown.

DETAILED DESCRIPTION

Figure 1:
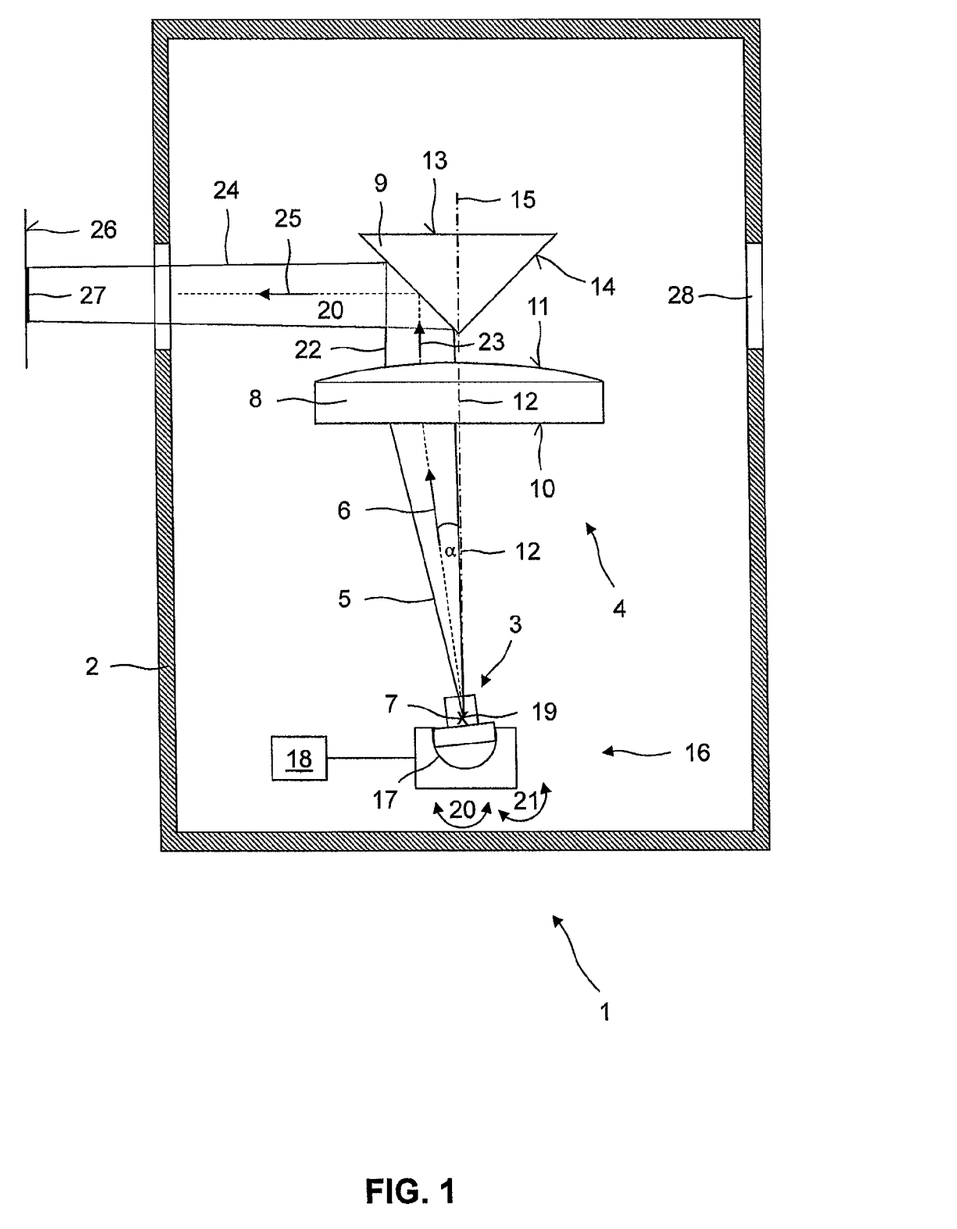
FIG. 1: a first embodiment of a laser system according to the invention, comprising a radiation source, a focusing lens and a conical mirror, whereby the angle between the radiation source and the focusing lens can be adjusted by means of an angle-adjusting device.

FIG. 1 shows a first embodiment of a laser system 1 according to the invention, comprising a housing 2, a radiation source 3 and an optical system 4. The radiation source 3 and the optical system 4 are arranged in the housing 2.

The radiation source 3 is configured as a semiconductor laser having a wavelength in the visible spectrum, for example, a red semiconductor laser having a wavelength of 635 nm or a green semiconductor laser having a wavelength of 532 nm or 555 nm. The radiation source 3 is configured as a punctiform radiation source that emits a laser beam 5 having a finite beam cross section along a direction of propagation 6. An intersection point 7 where the edge beams of the laser beam 5 intersect is defined as the virtual point source of the radiation source 3. In the case of laser beams with a symmetrical beam distribution, the axis of symmetry is defined as the direction of propagation 6 of the laser beam 5. In the case of laser beams with an elliptical beam distribution, the direction of propagation 6 is defined as the axis of symmetry of the ellipsis. For example, if a symmetrical laser beam is restricted by a screen, the direction of propagation remains unchanged, only the centroid of the limited laser beam changes.

The optical system 4 is arranged in the beam path of the laser beam 5 behind the radiation source 3. The optical system 4 comprises a first optical element 8 that is configured as a focusing lens assembly, and a second optical element 9 that is configured as a conical mirror. The focusing lens assembly 8 is configured as a focusing lens and it has a flat light-refracting surface 10 as well as a convex light-refracting surface 11. A straight line that runs through the center of curvature of the convex surface 11 and that is perpendicular to the flat surface 10 is defined as the optical axis 12 of the focusing lens 8. The conical mirror 9 is configured as the section of a straight cone having a circular base surface 13 and a reflecting lateral surface 14; the cone axis 15 runs perpendicular to the base surface 10. The optical axis 12 of the focusing lens 8 and the cone axis 15 of the conical mirror 9 are arranged coaxially to each other.

In order to create a closed laser marking encompassing 360° on a projection surface by means of the conical mirror 9, the radiation source 3 is oriented in such a way that the virtual point source of the laser beam 5 and the cone axis 15 of the conical mirror 9 are arranged coaxially with respect to each other. In the first laser system 1 according to the invention, the beamwidth of a linear laser marking on a projection surface can be adjusted via the position of the radiation source 3 relative to the conical mirror 8. For this purpose, an angle-adjusting device 16 is provided with which the angle α of the radiation source 3 can be adjusted. The angle between the direction of propagation 6 of the laser beam 5 and the optical axis 12 of the focusing lens 8 is defined as the angle α of the radiation source 3. The angle-adjusting device 16 comprises a bearing element configured as a spherical cap 17 and a motor-driven adjustment unit 18. The radiation source 3 is mounted in the spherical cap 17 and it is configured so that it can rotate around a center of rotation 19 in a first direction 20 and in a second direction 21, whereby the center of rotation 19 coincides with the virtual point source 7 and is located on the optical axis 12 of the focusing lens 8.

The radiation source 3 generates the laser beam 5 that is directed at the focusing lens 8 along the direction of propagation 6. The divergent laser beam 5 strikes the focusing lens 8 that focuses the laser beam and directs it, as a focused laser beam 22, at the conical mirror 9 along a direction of propagation 23. The direction of propagation 23 of the focused laser beam 22 runs parallel to the optical axis 12 of the focusing lens 8 and parallel to the cone axis 15 of the conical mirror 9. The focused laser beam 22 is offset with respect to the cone axis 15 of the conical mirror 9. The conical mirror 9 deflects the focused laser beam 22 by 90° and generates a laser beam 24 that propagates along a direction of propagation 25 and generates a linear laser marking 27 on a projection surface 26.

The laser beam 24 is outcoupled from the housing 2 by means of an outcoupling window 28 that is provided in the housing 2.

The inclination of the direction of propagation 6 of the laser beam 5 relative to optical axis 12 of the focusing lens 8 and to the cone axis 15 of the conical mirror 9 causes the focused laser beam 22 to strike the lateral surface 14 of the conical mirror 9 so as to be offset parallel to the cone axis 15. The section of the lateral surface 14 of the conical mirror 9 that is illuminated by the focused laser beam 22 and thus the beamwidth of the linear laser marking 27 on the projection surface 26 can be adjusted by means of the inclination of the radiation source 3.

Figure 2:
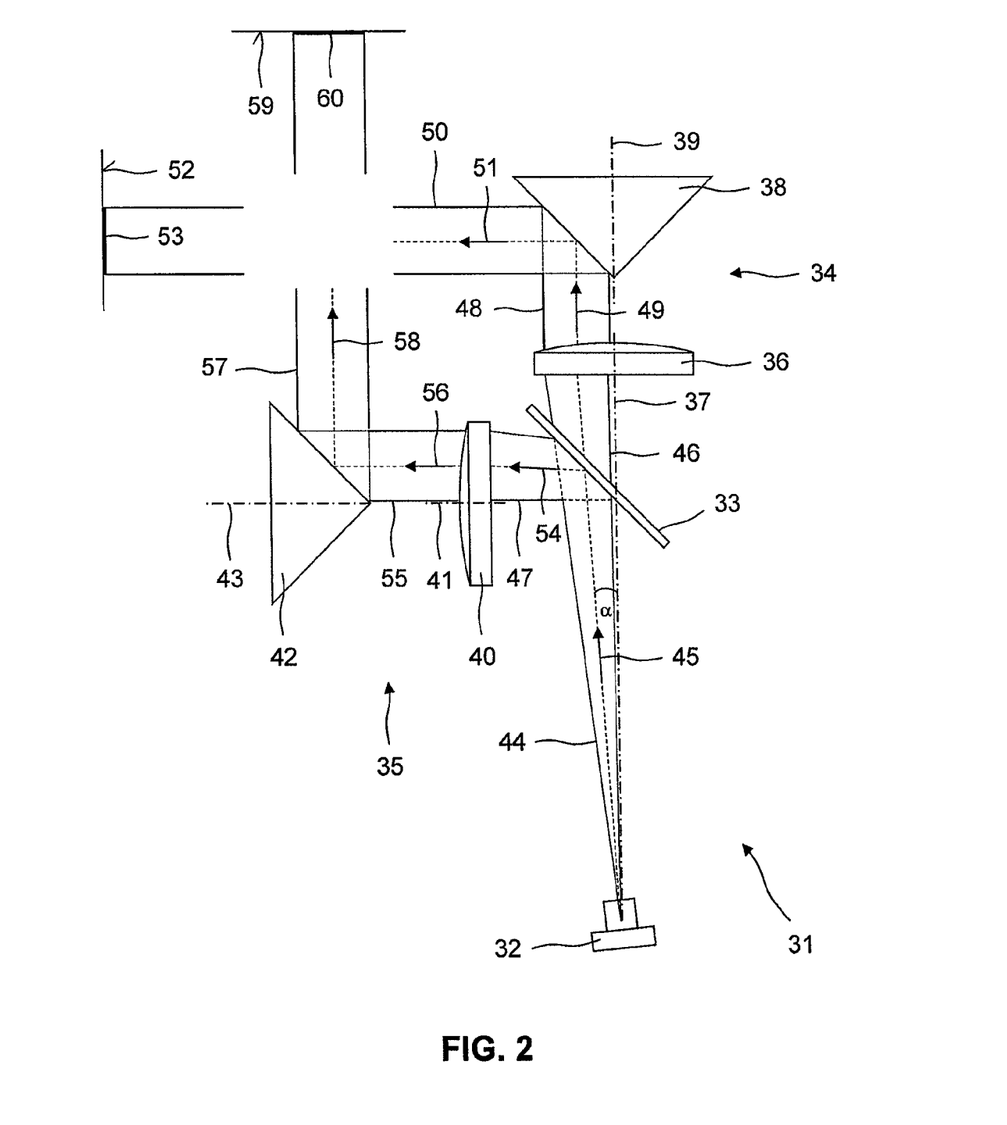
FIG. 2: a second embodiment of a laser system according to the invention, comprising a radiation source, a beam-splitting lens assembly, a first optical system consisting of a focusing lens assembly and a conical mirror, and a second optical system consisting of a focusing lens assembly and a conical mirror.

FIG. 2 shows a second laser system 31 according to the invention, consisting of a radiation source 32, a beam-splitting lens assembly 33, a first optical system 34, a second optical system 35. The first optical system 34 comprises a first collimating lens 36 with a first optical axis 37 and a first conical mirror 38 with a first cone axis 39, whereby the first optical axis 37 is arranged coaxially to the first cone axis 39. The second optical system 35 comprises a second collimating lens 40 with a second optical axis 41 and a second conical mirror 42 with a second cone axis 43, whereby the second optical axis 41 is arranged coaxially to the second cone axis 43. Instead of the first and/or second conical mirrors 38, 42, as an alternative, an otherwise suitable optical element for expanding a laser beam such as, for instance, a cylindrical lens, can be used.

The radiation source 32 generates a laser beam 44 that propagates along a direction of propagation 45 and that is directed at the beam-splitting lens assembly 33. The beam-splitting lens assembly 33 splits the laser beam 44 into a first partial beam 46 and into a second partial beam 47. A laser system with a radiation source and a beam-splitting lens assembly that generates several partial beams is especially well-suited for laser wavelengths that are highly visible to the human eye such as, for example, the green laser wavelengths of 532 nm and 555 nm.

The first partial beam 46 passes through the beam-splitting lens assembly 33 without being hindered and strikes the first collimating lens 36 that collimates the first partial beam 46 and directs it, as a collimated first partial beam 48, at the first conical mirror 37 along a direction of propagation 49. The collimated first partial beam 48 strikes the first conical mirror 38 so as to be offset parallel to the cone axis 39. The first conical mirror 38 deflects the collimated first partial beam 48 by 90° and generates a laser beam 50 that propagates along a direction of propagation 51 and creates a first linear laser marking 53 on a first projection surface 52.

The second partial beam 47 is reflected off the beam-splitting lens assembly 33 and is directed at the second collimating lens 40 along a direction of propagation 54. The second collimating lens 40 collimates the second partial beam 47 and directs a collimated second partial beam 55 at the second conical mirror 42 along a direction of propagation 56 so as to be offset parallel to the cone axis 43. The second conical mirror 42 deflects the collimated second partial beam 55 by 90° and generates a second laser beam 57 that propagates along a direction of propagation 58 and creates a second linear laser marking 60 on a second projection surface 59.

The second laser system 31 according to the invention generates two laser beams 50, 57 that propagate in perpendicular directions of propagation 51, 58 and that each generate a linear laser marking 53, 60 on a projection surface 52, 59, respectively.

Figure 3:
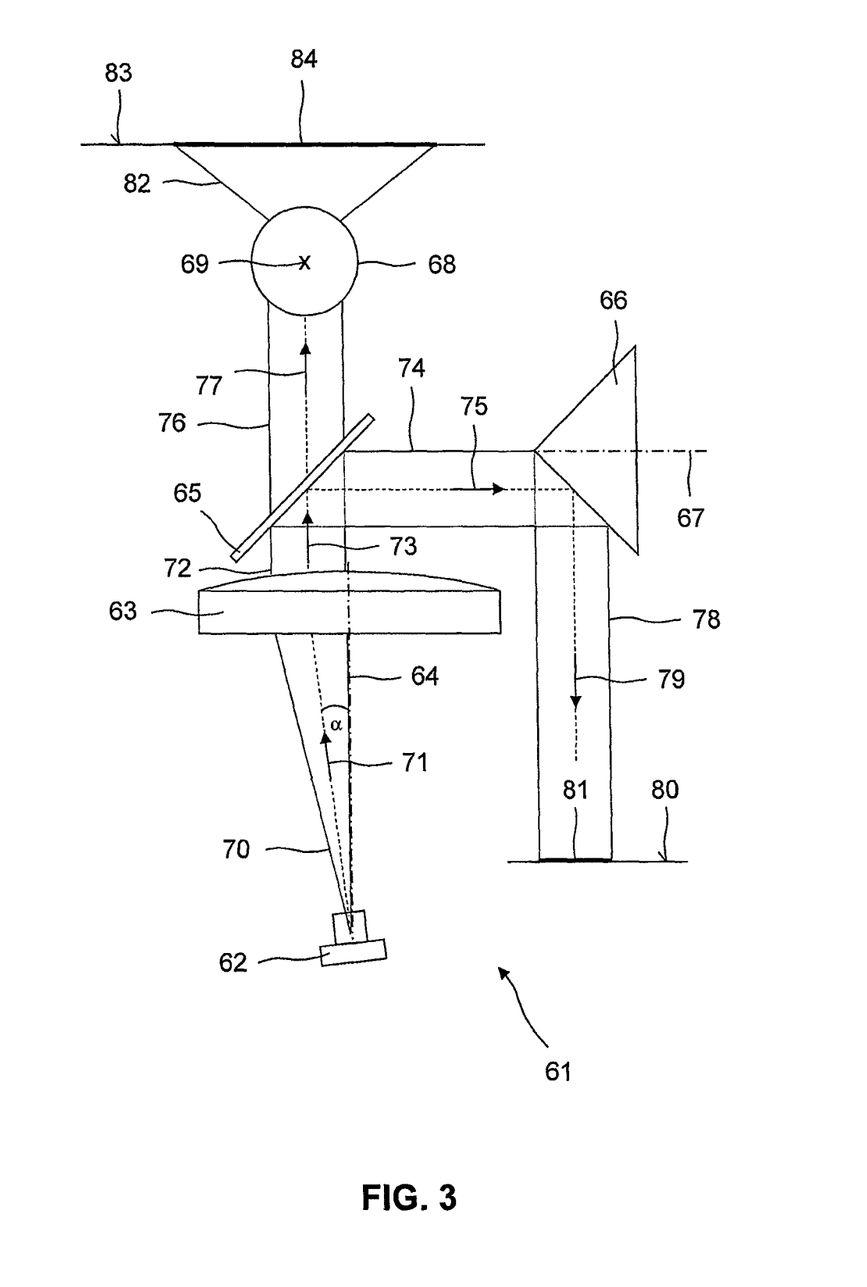
FIG. 3: a third embodiment of a laser system according to the invention, comprising a radiation source, a collimating lens assembly, a beam-splitting lens assembly, a conical mirror and a cylindrical lens.

FIG. 3 shows a third laser system 61 according to the invention, consisting of a radiation source 62, a collimating lens 63 with an optical axis 64, a beam-splitting lens assembly 65 as well as a conical mirror 66 with a cone axis 67, and a cylindrical lens 68 with a cylinder axis 69. The optical axis 64 of the collimating lens 63 is arranged coaxially to the cone axis 67 of the conical mirror 66 and coaxially to the cylinder axis 69 of the cylindrical lens 68.

The radiation source 62 generates a laser beam 70 that propagates along a direction of propagation 71 and that is directed at the collimating lens 63. Analogously to the radiation sources 3, 32, the radiation source 62 is inclined relative to the optical axis 64 of the collimating lens 63 by the angle α, whereby the angle α between the direction of propagation 71 of the laser beam 70 and the optical axis 64 of the collimation lens 63 is measured.

The collimating lens 63 collimates the laser beam 70 and directs the laser beam, as a collimated laser beam 72, at the beam-splitting lens assembly 65 along a direction of propagation 73. Since the center of rotation of the radiation source 62 coincides with the virtual point source of the radiation source and since the center of rotation is located on the optical axis 64, the direction of propagation 73 of the collimated laser beam 72 is oriented parallel to the optical axis 64 of the collimating lens 63.

The beam-splitting lens assembly 65 splits the collimated laser beam 72 into a first partial beam 74 along a first direction of propagation 75 and into a second partial beam 76 along a second direction of propagation 77. The first partial beam 74 is reflected off the beam-splitting lens assembly 65 and strikes the conical mirror 66. The conical mirror 66 deflects the first partial beam 74 by 90° and generates a first laser beam 78 that propagates along a direction of propagation 79 and creates a first linear laser marking 81 on a first projection surface 80. The second partial beam 76 passes through the beam-splitting lens assembly 65 unhindered and strikes the cylindrical lens 68. The cylindrical lens 86 generates a second laser beam 82 that creates a second linear laser marking 84 on a second projection surface 83. Beam 82, marking 84 and surface 83 are shown schematically, and a normal to surface 83 is actually parallel to cylinder axis 69.

Figure 4:
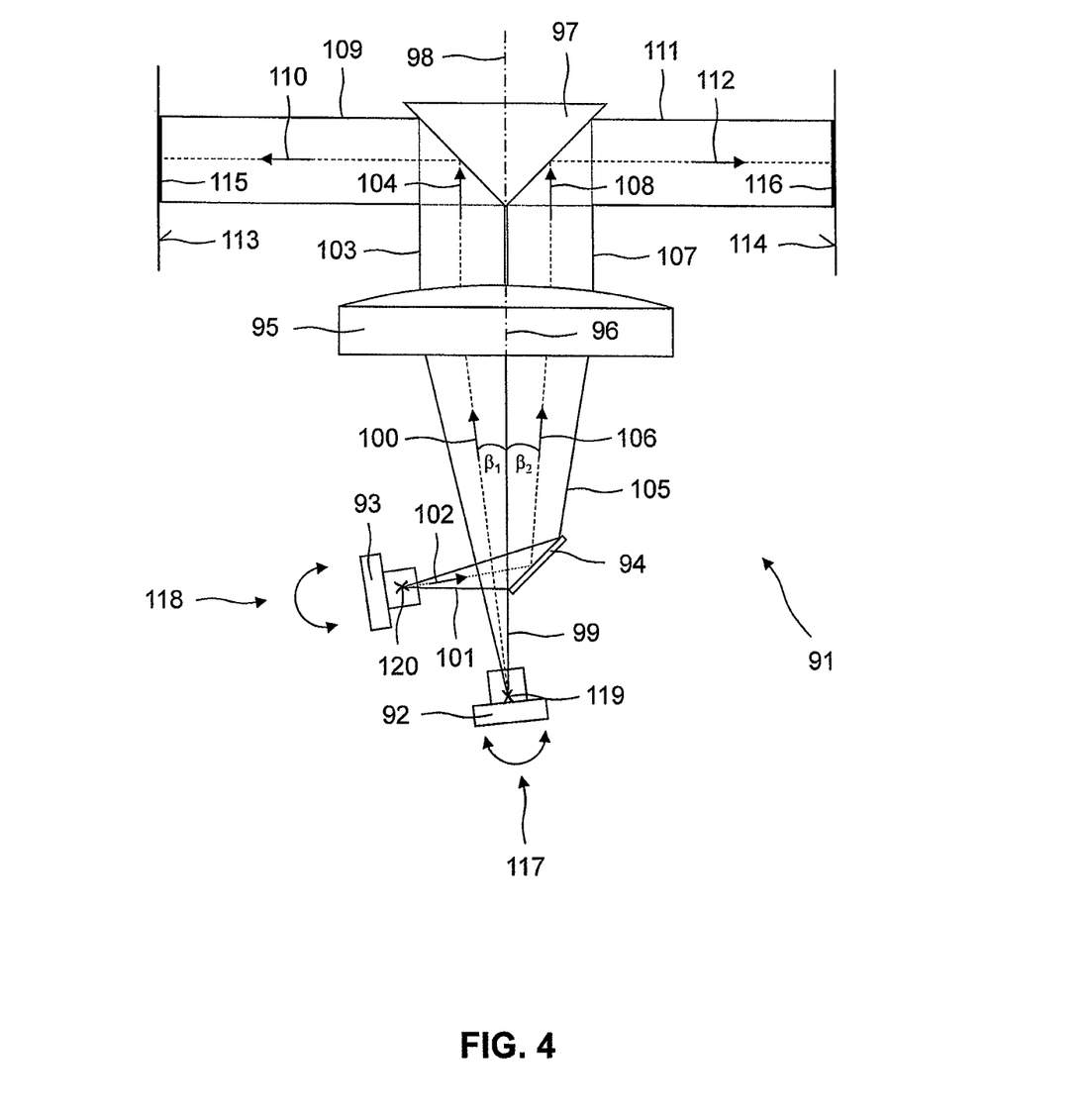
FIG. 4: a fourth embodiment of a laser system according to the invention, comprising a first radiation source, a second radiation source, a deflecting mirror, a collimating lens and a conical mirror.

FIG. 4 shows a fourth laser system 91 according to the invention, consisting of a first radiation source 92, a second radiation source 93, a deflecting mirror 94, a collimating lens 95 with an optical axis 96 and a conical mirror 97 with a cone axis 98, whereby the optical axis 96 of the collimating lens 95 is arranged coaxially to the cone axis 98 of the conical mirror 97. The first radiation source 92 generates a first laser beam 99 along a first direction of propagation 100, and the second radiation source 93 generates a second laser beam 101 along a second direction of propagation 102.

After the first laser beam 99 exits the first radiation source 92 at a first angle $\beta_1$, it strikes the collimating lens 95 that collimates the first laser beam 99 and directs it, as a collimated first laser beam 103, at the conical mirror 97 along a direction of propagation 104. The direction of propagation 104 of the collimated first laser beam 103 runs parallel to the cone axis 98 of the conical mirror 97.

After the second laser beam 101 exits the second radiation source 93, it strikes the deflecting mirror 94 that deflects the second laser beam 101 and directs it, as a deflected laser beam 105, at the collimation mirror 95 along a direction of propagation 106. The direction of propagation 106 of the deflected second laser beam 105 is inclined at a second angle $\beta_2$ relative to optical axis 96 of the collimating lens 95. The collimating lens 95 collimates the deflected second laser beam 105 and directs it, as a collimated second laser beam 107, at the conical mirror 97 along a direction of propagation 108. The direction of propagation 108 of the collimated second laser beam 107 runs parallel to the cone axis 98 of the conical mirror 97.

The conical mirror 97 deflects the collimated first and second laser beams 103, 107 by 90° each and generates a first laser beam 109 that propagates along a first direction of propagation 110, and a second laser beam 111 that propagates along a second direction of propagation 112. The first and second laser beams 109, 111 create a first and second linear laser marking 115, 116 on a projection surface 113, 114, respectively.

The first radiation source 92 is inclined at the first angle $\beta_1$ and the second radiation source 93 is inclined at the second angle $\beta_2$ relative to the optical axis 96 of the collimating lens 95. The angles $\beta_1$, $\beta_2$ are defined analogously to the angle α of the first laser system 1 and are configured so as to be adjustable. A first angle-adjusting device 117 and a second angle-adjusting device 118 are provided for this purpose. The first radiation source 92 can be rotated around a first center of rotation 119 by means of the first angle-adjusting device 117, and the second radiation source 93 can be rotated around a second center of rotation 120 by means of the second angle-adjusting device 118.

Figure 5:
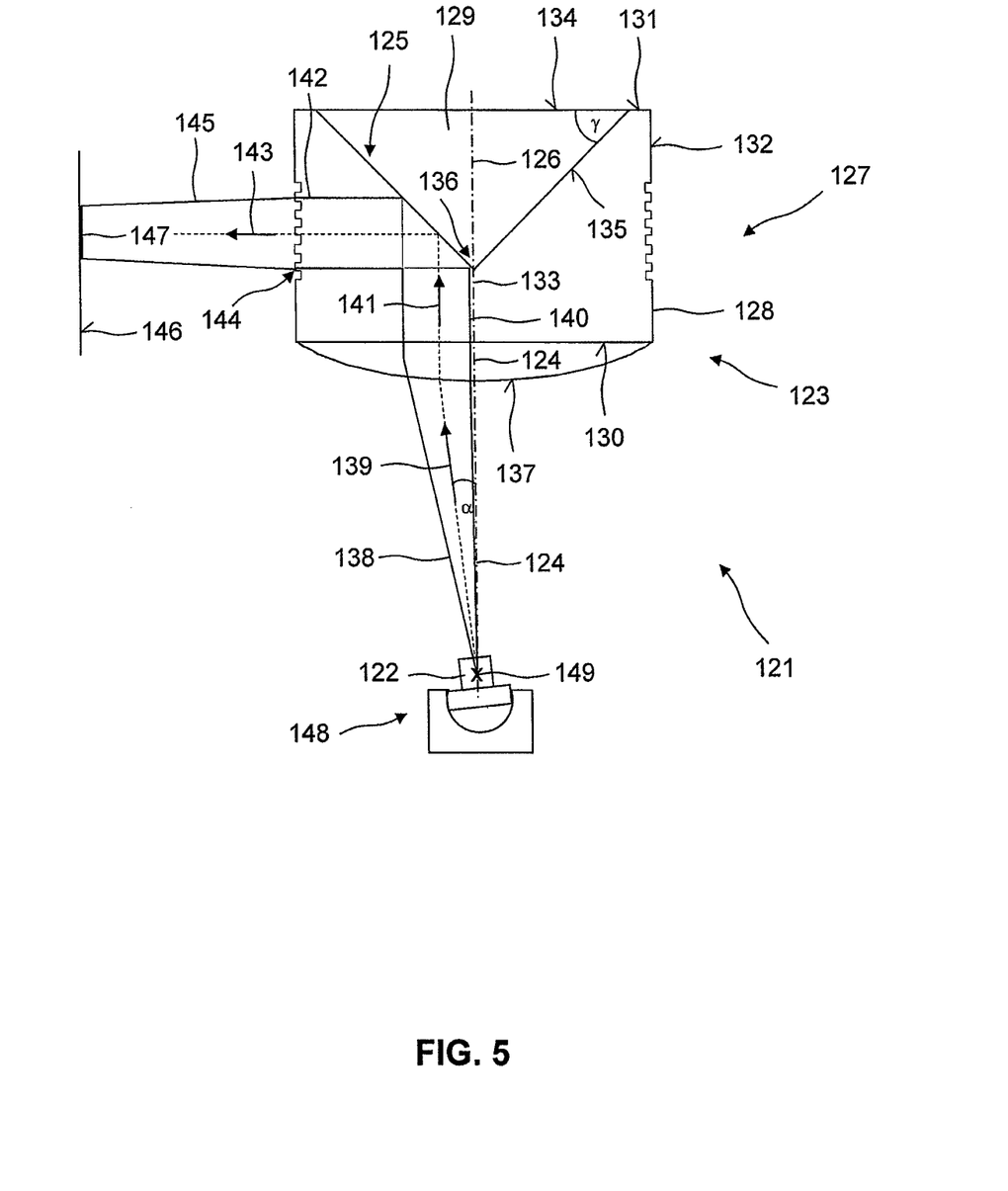
FIG. 5: a fifth embodiment of a laser system according to the invention, comprising a radiation source, a collimating lens assembly and a conical mirror, whereby the collimating lens assembly and the conical mirror are integrated into a shared beam-shaping lens assembly.

FIG. 5 shows a fifth laser system 121 according to the invention, consisting of a radiation source 122, a collimating lens assembly 123 with an optical axis 124, and a conical mirror 125 with a cone axis 126. The collimating lens assembly 123 and the conical mirror 125 are integrated into a shared beam-shaping lens assembly 127.

The beam-shaping lens assembly 127 is configured as a base in the form of a straight circular cylinder 128 with a section in the form of a straight circular cone 129. A circular cylinder is a cylinder with a circular base surface. A cylinder is limited by two parallel, flat surfaces, which are referred to as the base surface and the cover surface, as well as by a lateral surface. In the case of a straight cylinder, the cylinder axis is perpendicular to the base surface. The surface of the circular cylinder 128 comprises a circular base surface 130, a circular cover surface 131 that is parallel to the base surface 130, and a lateral surface 132 that joins the base surface 130 and the cover surface 131. The base surface 130 and the cover surface 131 are arranged perpendicular to a cylinder axis 133, and the lateral surface 132 is arranged parallel to a cylinder axis 133.

The base surface 130 and the lateral surface 132 each constitute a boundary surface between the beam-shaping lens assembly 127 and the environment, and they are designated as transmission surfaces for the laser beam. The degree of transmission of a transmission surface depends, among other things, on the angle of incidence of an incident laser beam and on the indices of refraction of the materials. The degree of transmission can be increased by providing the transmission surface with a coating. The higher the transmitted fraction of the laser beam, the greater the intensity and thus the better the visibility of the laser beam on a target object.

The surface of the conical section 129 encompasses a circular base surface 134 that is arranged perpendicular to the cone axis 126, and a lateral surface 135 that is adjacent to the base surface 134 and that is arranged at an angle γ relative to the base surface 134. The base surface 134 of the circular cone 129 is located on the cover surface 131 of the circular cylinder 128, and the cone axis 126 runs colinearly to the cylinder axis 133, so that there is a cone tip 136 on the cylinder axis 133.

The collimating lens assembly 123 is integrated into the base surface 130 of the circular cylinder 128. In this context, integration means that the collimating lens assembly 123 is immediately adjacent to the base surface 130 of the circular cylinder 128 and that there is no boundary surface between the base surface 130 and the collimating lens assembly 123.

The term "boundary surface" is defined as a surface situated between two media having different indices of refraction. The collimating lens assembly 123 is configured as an aspherical curved lens.

The beam-shaping lens assembly 127 with the integrated collimating lens assembly 123 is made monolithically of a single material. Suitable materials for the beam-shaping lens assembly 127 include, for example, glass and plastics. In the case of glass, the aspherical curvature is made by diamond-cutting, replica methods, grinding and polishing, or by pressing at a high temperature using a glass blank, or in the case of plastic, by injection molding or by injection-compression molding. The surface of the collimating lens assembly 123 facing away from the base surface 130 of the circular cylinder 128 forms a curved entry surface 137 for the laser beam. Here, the size of the collimation is adjusted via the radius of curvature of the entry surface 137.

The lateral surface 135 of the conical section 129 forms a boundary surface between the beam-shaping lens assembly 127 and the environment, and will be referred to below as the reflection surface. The degree of reflection of a reflection surface depends, among other things, on the angle of incidence of an incident laser beam and on the indices of refraction of the materials. In order for the incident laser beam to be reflected off the lateral surface 135 to the greatest extent possible, the angle of incidence should meet the criterion of total reflection. The reflected fraction can be alternatively or additionally increased by providing the reflection surface with a highly reflective coating. The higher the reflected fraction of the laser beam, the greater the intensity and thus the better the visibility of the laser beam on a target object.

The radiation source 122 generates a laser beam 138 that propagates along the direction of propagation 139 and that is directed at the collimating lens assembly 123. The divergent laser beam 138 strikes the curved entry surface 137, which generates a collimated laser beam 140. The collimated laser beam 140 propagates along a direction of propagation 141 through the beam-shaping lens assembly 127 and strikes the reflection surface 135 of the conical section 129 that forms the conical mirror 125. The reflection surface 135 converts the collimated laser beam 140 into a laser beam 142 that propagates along a direction of propagation 143. The laser beam 142 strikes the lateral surface 132 of the circular cylinder 128, which is also referred to as an exit surface.

The embodiment of the beam-shaping lens assembly 127 shown in FIG. 5 is another beam-shaping optical element in the form of a focusing lens assembly 144 integrated into the lateral surface 132. The focusing lens assembly 144 is configured as a microstructured surface in the form of a diffractive optical element. Diffractive optical elements function fundamentally like an optical grid and they split an incident laser beam into various orders of diffraction as a function of the angle. Diffractive optical elements have the advantage that laser beams can be generated in virtually any desired beam distribution. They are made by means of photolithographic production methods as well as by means of scanning structuring processes such as diamond-cutting, laser-beam engraving or electron-beam engraving. The laser beam 142 is converted by the focusing lens assembly 144 into a focused laser beam 145 that propagates along the direction of propagation 143. The focused laser beam 145 creates a liner laser marking 147 on a projection surface 146.

The radiation source 122 is arranged at an angle $\alpha$ relative to the optical axis 124 of the collimating lens assembly 123. The angle $\alpha$ is configured so that it can be adjusted by means of an angle-adjusting device 148. The radiation source 122 is configured so that, by means of the angle-adjusting device 148, it can rotate around a center of rotation 149 that lies on the optical axis 124 of the collimating lens assembly 123. The center of rotation 149 coincides with the virtual point source of the radiation source 122 and is arranged on the optical axis 124 of the collimating lens assembly 123.

What is claimed is:

1. A laser system for creating a linear laser marking, the laser system comprising:
    a radiation source emitting a laser beam along a direction of propagation;
    a focusing lens assembly with an optical axis; and
    a conical mirror being configured, at least in certain areas, as a straight cone with a cone axis and a reflecting lateral surface, the conical mirror being arranged in a beam path of the laser beam after the focusing lens assembly, the cone axis being oriented parallel to the optical axis of the focusing lens assembly,
    the direction of propagation of the laser beam being inclined at an angle relative to the optical axis of the focusing lens assembly.

2. The laser system as recited in claim 1 further comprising an angle-adjuster capable of adjusting the angle around a center of rotation, the center of rotation of the angle-adjuster coinciding with a virtual point source of the radiation source.

3. The laser system as recited in claim 2 wherein the center of rotation of the angle-adjuster is arranged on the optical axis of the focusing lens assembly.

4. The laser system as recited in claim 2 wherein the angle is adjustable in a first direction and in a second direction.

5. The laser system as recited in claim 2 wherein the angle-adjuster is a motor-driven angle adjuster.

6. The laser system as recited in claim 1 further comprising a beam-splitting lens assembly splitting the laser beam into a first partial beam along a first direction of propagation and into a second partial beam along a second direction of propagation.

7. The laser system as recited in claim 6 wherein the beam-splitting lens assembly is arranged in the beam path of the laser beam after the focusing lens assembly.

8. The laser system as recited in claim 1 wherein the focusing lens assembly and the conical mirror are integrated into a shared beam-shaping lens assembly.

9. The laser system as recited in claim 1 further comprising a second radiation source, the second radiation source emitting a second laser beam along a second direction of propagation.

10. The laser system as recited in claim 9 wherein the second direction of propagation of the second laser beam is inclined at a second angle relative to the optical axis of the focusing lens assembly.

11. The laser system as recited in claim 10 further comprising a first angle-adjuster for adjusting the angle and a second angle-adjuster for adjusting the second angle.

12. The laser system as recited in claim 9 wherein the radiation source and the second radiation source have different laser wavelengths.

13. The laser system as recited in claim 9 wherein the radiation source and second radiation sources have a same laser wavelength.

* * * * *